United States Patent
Fultz et al.

[11] Patent Number: 5,219,147
[45] Date of Patent: Jun. 15, 1993

[54] VALVE LOCK

[75] Inventors: Christopher B. Fultz, Indianapolis; James H. Caputo, Plainfield, both of Ind.

[73] Assignee: General Motors Corporation, Detroit, Mich.

[21] Appl. No.: 946,697

[22] Filed: Sep. 18, 1992

[51] Int. Cl.$^5$ .............................................. F16K 35/00
[52] U.S. Cl. ...................................................... 251/90
[58] Field of Search ................... 137/385, 383; 251/90, 251/92, 93; 141/346, 347

[56] References Cited
U.S. PATENT DOCUMENTS
4,971,289  11/1990  Pietras ............................... 137/385
5,094,265  3/1992  Jackson ................................ 251/92

Primary Examiner—Martin P. Schwadron
Attorney, Agent, or Firm—Saul Schwartz

[57] ABSTRACT

A shut off valve has a valve lock that snaps onto a cylindric of the valve body and locks the shut-off valve in its open position by retaining the cross bar of a rotatable T-shaped handle in a parallel position in a housing portion of the valve lock. The valve lock also snaps onto the cylindrical end section to retain the cross bar in a perpendicular position at the end of the housing portion to lock the shut-off valve in its closed position.

14 Claims, 1 Drawing Sheet

VALVE LOCK

BACKGROUND OF THE INVENTION

This invention relates generally to valves and more particularly to a valve lock for locking the valve in either of two operative positions.

There is a need and often a requirement to lock certain valves in one operative position or another positively. For example, there is a requirement to lock an air shut-off valve of a heater kit for a gas turbine engine in either its open position or its closed position positively.

This is now conventionally accomplished by use of retaining wires. The retaining wire is wrapped through a hole in the valve handle and then to the valve body to hold the valve handle in either the open or the closed position depending on need. While a retaining wire may be suitable in many instances, there are situations where the installation of a retaining wire is not feasible. For example many engine installations, particularly aircraft engine installations have valves that are located in relatively inaccessible places that make installation of a safety wire extremely difficult if not impossible.

SUMMARY OF THE INVENTION

The object of this invention is to provide an improved valve lock that is installed easily even when the valve is located in a relatively inaccessible place. A feature of the invention is that the improved valve lock can be installed easily to lock the valve in either of two operative positions, such as the open and closed positions.

Another feature of the invention is that the improved valve lock can be installed or removed manually with light finger pressure and without the need for any tools.

Another feature of the invention is that the improved valve lock can be installed or removed single handedly which is particularly useful for valves in relatively inaccessible locations.

Yet another feature of the invention is that the improved valve lock is designed to produce an audible sound or click when it is installed or removed thereby facilitating installation, and particularly in blind installations.

Still another feature of the invention is that the improved valve lock has a symmetrical design so that it fits on the valve either way or on either end.

BRIEF DESCRIPTION OF THE DRAWINGS

The above and other objects, features and advantages of the invention will become more apparent from the following description taken in conjunction with the accompanying drawings wherein like references refer to like parts an wherein.

DESCRIPTION OF THE INVENTION

Figure 1:
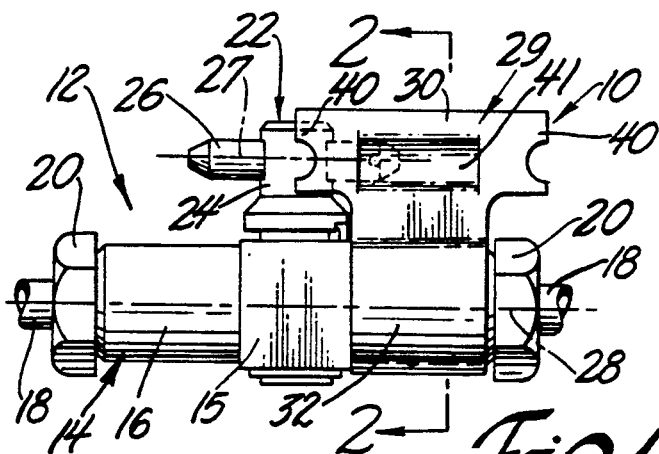
FIG. 1 is a front view of an improved valve lock of this invention installed on a shut-off valve that is in the open position.

Referring now to the drawing, an improved valve lock 10 of the invention is installed on a shut-off valve 12 to lock it in its open position or in its closed position as shown in FIGS. 1 and 2 and FIGS. 3 and 4 respectively. The shut-off valve 12 has a valve body 14 comprising a central box section 15 and smaller cylindrical end sections 16 of predetermined equal length. Each end section 16 is attached to a conduit 18 by a fitting that is screwed into the ends of the cylindrical end sections 16 by means of its enlarged hexagonal head 20, that serves as a stop shoulder when the fitting is installed.

The central box section 15 supports a rotatable spigot or other suitable closure member within the valve body 14 that is moved between an open position and a closed position by a T-shaped handle 22 that comprises a valve stem 24 and an elongated cross bar 26. The valve stem 24 is connected to the closure member and it has a protruding portion projecting outwardly of the central box section 15. The elongated cross bar 26 is connected to the protruding portion of the valve stem 24 for rotating the closure member between the open and the closed positions.

Figure 2:
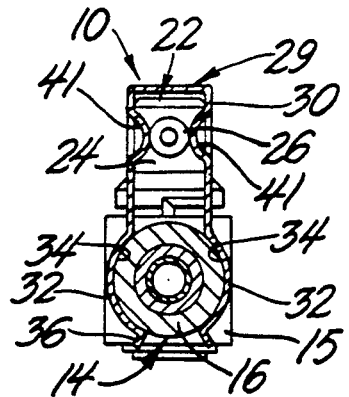
FIG. 2 is a section taken substantially along the line 2—2 of FIG. 1 looking in the direction of the arrows.

The elongated cross bar 26 is connected to the valve stem 24 midway between its ends and its axis 27 is disposed substantially coplanar with the longitudinal axis 28 of the valve body 14 when the closure member is in one of its operative positions, such as the open position shown in FIGS. 1 and 2. On the other hand, the elongated cross bar 26 is disposed with its axis substantially perpendicular to the longitudinal axis 28 of the valve body 14 when the closure member is in the other of its operative positions, for example the closed position shown in FIGS. 3 and 4. While this particular shut-off valve is open when the cross bar 26 is coplanar or parallel and closed when the cross bar 26 is perpendicular, it should be understood that the invention is applicable to other valve arrangements, such as those having an operating bar or handle that is parallel when the valve is closed and perpendicular when the valve is open or those valves where the two positions of the elongated bar or handle correspond to any two different operative positions of the valve member inside the valve body.

Focussing now on the valve lock 10, it comprises a channel shaped body 29 that is made of a stiffly resilient material such as spring steel. It has an upper U-shaped housing 30 for receiving the elongated bar 26 when its axis 28 is disposed substantially parallel to the axis 29 of the valve body 14, and a lower clamp comprising parallel special clamping portions 32 that are interconnected by the housing 30. The clamping portions 32 have confronting concave surfaces 34 and free lower ends 36 that define a gap 38. The U shaped housing 30 contains elongated indentations 41 on both sides that are essentially along the horizontal plane of axis 27, such that the indentations provide a slight interference with the elongated bar 26 to further lock the elongated bar 26 in position when the elongated bar 26 is substantially parallel to the valve body 14 (i.e., with their axes substantially coplanar).

The gap 38 has a width W that is less than a minimum width or diameter of the cylindrical end section 16 of the valve body 14 when the channel shaped body 29 is in a free unflexed state. However, the channel shaped body 29 is sufficiently resilient so that the clamping portions 32 snap fit onto the cylindrical end sections 16 to retain the valve lock 10 on the valve body 14 when either cylindrical end section 16 is pushed through the gap 38 with its longitudinal axis 28 disposed substantially parallel to the longitudinal axis of the valve lock 10. The free lower ends 36 of the clamping portions 32 are flared outwardly away from each other to facilitate this snap insertion.

The characteristics of the stiffly resilient material of the valve lock 10 and the size of the gap 38 is preferably such that the valve lock 10 makes an audible sound or click when the cylindrical end sections 16 of the valve body 14 are snapped into or out of the lower clamp through the gap 38 defined by the clamping portions 32.

The clamping portions 3 of the channel shaped body 29 have a length that is no greater than and preferably substantially equal to the identical lengths of the cylindrical end sections 16 of the valve body 14 so that the clamping portions 32 fit onto either cylindrical end sections 16 between the box section 15 and the enlarged head 20 of the fittings for conduits 18.

Figure 3:
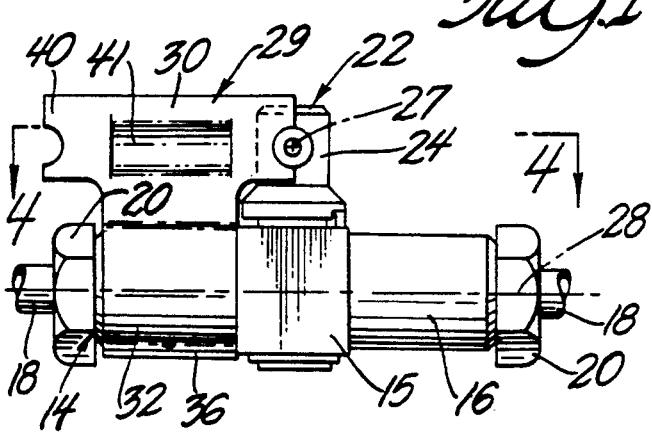
FIG. 3 is a front view of the improved valve lock of FIG. 1 installed on the shut-off valve when it is in the closed position.
Figure 4:
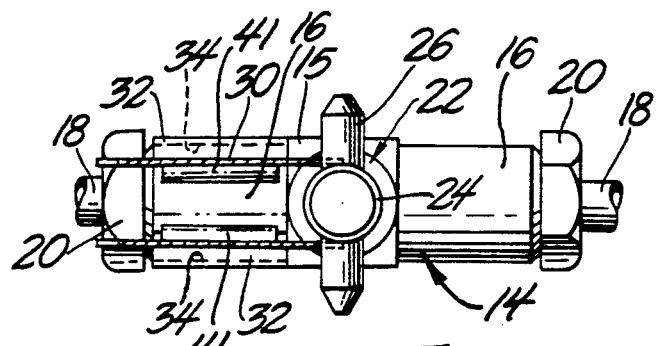
FIG. 4 is a section taken substantially along the line 4—4 of FIG. 3 looking in the direction of the arrows.
Figure 5:
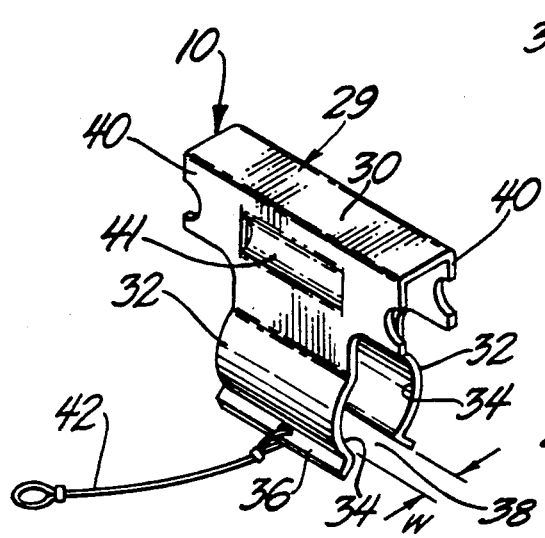
FIG. 5 is an isometric view of the improved valve lock.

When the bar 26 is substantially parallel to the valve body 14 (i.e., with their axes substantially coplanar) the bar 26 is received in the housing 30 to lock the closure member in its open position as shown in FIGS. 1 and 2. When the bar 26 is substantially perpendicular to the valve body 14 the bar 26 fits in a non-interference position adjacent and buttressed by an end of the housing 30 to lock the closure member (and the valve 12) in its closed position as shown in FIGS. 3 and 4.

The upper housing 30 has an axial finger grip extension 40 at each end. One overlies the valve stem 24 (and both sides of the bar 26 is in the closed position) when the valve lock 10 is installed. However the finger grip 40 at the other end is accessible. This finger grip 40 is used to remove the installed valve lock 10 easily. The valve lock 10 is symmetrical and thus it can be installed either way, i.e., as shown or flipped over end for end from the position shown. Moreover, the valve lock 10 can be installed on either cylindrical end section 16 as shown in FIGS. 1 and 2 and FIGS. 3 and 4 respectively.

The valve lock 10 also includes a strap 42 for attaching the valve lock 10 to the conduit 18 or other nearby support that keeps the valve lock 10 handy and in operative vicinity of the shut-off valve 12 when it is being opened or closed.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

What is claimed is:

1. A valve lock for locking a shut-off valve in an open position or a closed position, the shut-off valve having a valve body comprising a central box section and smaller cylindrical end sections of predetermined length that are attached to conduits by means of fittings having enlarged heads at the ends of the respective cylindrical end sections, the valve having a rotatable T-shaped handle for moving a closure member within the central box section between an open position and a closed position, the rotatable T-shaped handle including a valve stem having a protruding portion projecting outwardly of the valve body, and an elongated cross bar connected to the protruding portion for rotating the closure member between the open and the closed position, the elongated cross bar being disposed parallel to a longitudinal axis of the valve when the closure member is in one of the open and closed positions and disposed with its axis substantially perpendicular to the longitudinal axis of the valve when the closure member is in the other of the open and closed positions, the valve lock comprising;

a channel shaped body of stiffly resilient material having an upper U-shaped housing for receiving the elongated cross bar when it is disposed with its axis substantially parallel to the longitudinal axis of the valve body including elongated indentations on both sides to provide a slight interference with the elongated cross bar, and a lower clamp comprising spaced parallel clamping portions interconnected by the upper U-shaped housing, the clamping portions having confronting concave surfaces and free lower ends defining a gap that has a width that is less than a minimum width or diameter of the cylindrical end sections of the valve body, the channel shaped body being sufficiently resilient so that the clamping portions snap fit onto the cylindrical end sections of the valve body to retain the valve lock on the valve body, the clamping portions of the channel shaped body having a length that is substantially equal to the length of the cylindrical end sections of the valve body between the housing section and the enlarged heads of the fittings so that the clamping portions fit onto one or another of the cylindrical end sections of the valve body when the elongated cross bar is parallel to the longitudinal axis of the valve and received in the U-shaped housing to lock the closure member in one of its open and closed positions, or when the cross bar is perpendicular to the longitudinal axis of the valve body and buttressed by an end of the U-shaped housing to lock the closure member in another of the open and closed positions.

2. The valve lock as defined in claim 1 wherein the channel shaped body is made of spring steel.

3. The valve lock as defined in claim 1 wherein the U-shaped housing has finger grip extensions at each end to facilitate removal of the valve lock.

4. The valve lock as defined in claim 1 wherein the channel shaped body is made of such stiffly resilient material and the width of the gap is sized so that the valve lock makes an audible click when the clamping portions are snap fit onto a cylindrical end section of the valve body.

5. The valve lock as defined in claim 1 wherein the valve lock includes a tether strap for retaining the valve attached to a support in operative vicinity of the shut-off valve so that the valve lock is handy when the setting of the valve is changed.

6. The valve lock as defined in claim 1 wherein the channel shaped body is symmetrical so that the valve lock can be installed flip flopped end for end.

7. The valve lock as defined in claim 1 wherein elongated indentations on both sides provide a slight interference with the elongated cross bar when the valve is in one of its operative positions.

8. A valve lock for locking a valve in a first operative position or a second operative position, the valve having a valve body comprising a housing section and a smaller cylindrical end section of predetermined length that is attached to a conduit by means of a fitting having an enlarged head at the end of the cylindrical end section, the valve having a rotatable handle for moving a closure member within the housing section between the first and the second operative positions, the rotatable handle comprising a valve stem having a protruding portion projecting outwardly of the housing section of the valve body and an elongated cross bar connected to the protruding portion for rotating the closure member between the first and the second operative positions, the elongated cross bar being disposed with its axis substantially coplanar with a longitudinal axis of the valve body when the closure member is in the first operative position and disposed with its axis substantially perpendicular to the longitudinal axis of the valve body when the closure member is in the second operative position, the valve lock comprising;

a channel shape-d body having an upper housing for receiving the elongated cross bar when it is disposed with its axis substantially coplanar with the longitudinal axis of the valve body, and spaced lower clamping portions interconnected by the upper housing, the clamping portions having confronting concave surfaces and free lower ends defining a gap that has a width that is less than a minimum width or diameter of the cylindrical end section of the valve body, the channel shaped body being sufficiently resilient so that the clamping portions snap fit onto the cylindrical end section of the valve body to retain the valve lock on the valve body, the clamping portions of the channel shaped body having a length that is substantially equal to the length of the cylindrical end section of the valve body between the housing section and the enlarged head so that the clamping portions fit onto the cylindrical end section of the valve body when the elongated cross bar is disposed with its axis substantially coplanar with the longitudinal axis to lock the closure member in the first operative position and the elongated cross bar is received in the housing or when the cross bar is disposed with its axis perpendicular to the longitudinal axis of the valve body and the cross bar is buttressed by an end of the housing to lock the closure member in the second operative position.

9. The valve lock as defined in claim 8 wherein the valve lock is made of a stiffly resilient material and the width of the gap is sized so that the valve lock makes an audible sound when the clamping portions are snap fit onto the cylindrical end section of the valve body.

10. The valve lock as defined in claim 9 wherein the housing includes an axial extension that provides a finger grip to facilitate removal and the valve lock includes a tether strap for retaining the valve lock attached to a support in operative vicinity of the valve to keep the valve lock handy when the valve setting is changed.

11. A valve lock for locking a valve in a first operative position or a second operative position, the valve having a valve body comprising a cylindrical section of predetermined length between spaced stop shoulders and a housing section for supporting a rotatable valve stem that moves a closure member within the valve body between the first and the second operative positions, the rotatable valve stem having a protruding portion projecting outwardly of the housing the housing section and an elongated bar connected to the protruding portion for rotating the valve stem and the closure member between the first and second operative positions, the elongated bar being disposed in a substantially coplanar position with respect to the valve body when the closure member is in the first operative position and disposed in a transverse position with respect to the valve body when the closure member is in the second operative position, the valve lock comprising;

a channel shaped body having an upper housing for receiving the bar when it is disposed in the substantially coplanar position including elongated indentations on both sides to provide a slight interference with the cross bar and end surfaces for buttressing the bar when it is disposed substantially in the transverse position, and lower clamping portions that are interconnected by the upper housing for clamping engagement with the cylindrical section of the valve body and that have free lower ends defining a gap that is narrower than a minimum width of the cylindrical section, the channel shaped body being sufficiently resilient so that the clamping portions snap fit onto the cylindrical section of the valve body to retain the valve lock on the valve body when the cylindrical section of the valve body is pushed through the gap, the clamping portions of the channel shaped body having a length that is no greater than the predetermined length of the cylindrical section of the valve body and the end surfaces of the housing being located such that the clamping portions fit onto the cylindrical section of the valve body only when the bar is in the substantially coplanar position and the bar is received in the housing to lock the closure member in the first operative position or when the bar is in the substantially transverse position and the bar is buttressed by the end surfaces of the housing to lock the closure member in the second operative position.

12. The valve lock as defined in claim 11 wherein the valve lock is made of a stiffly resilient material and the gap is sized so that the valve lock makes an audible sound when the clamping portions are snap fit onto the cylindrical section of the valve body.

13. The valve lock as defined in claim 12 wherein the housing includes a finger grip to facilitate removal of the valve lock 14. The valve lock as defined in claim 13 wherein the valve lock includes a tether strap for retaining the valve attached to a support in operative vicinity of the valve.

* * * * *